United States Patent Office 3,447,254
Patented June 3, 1969

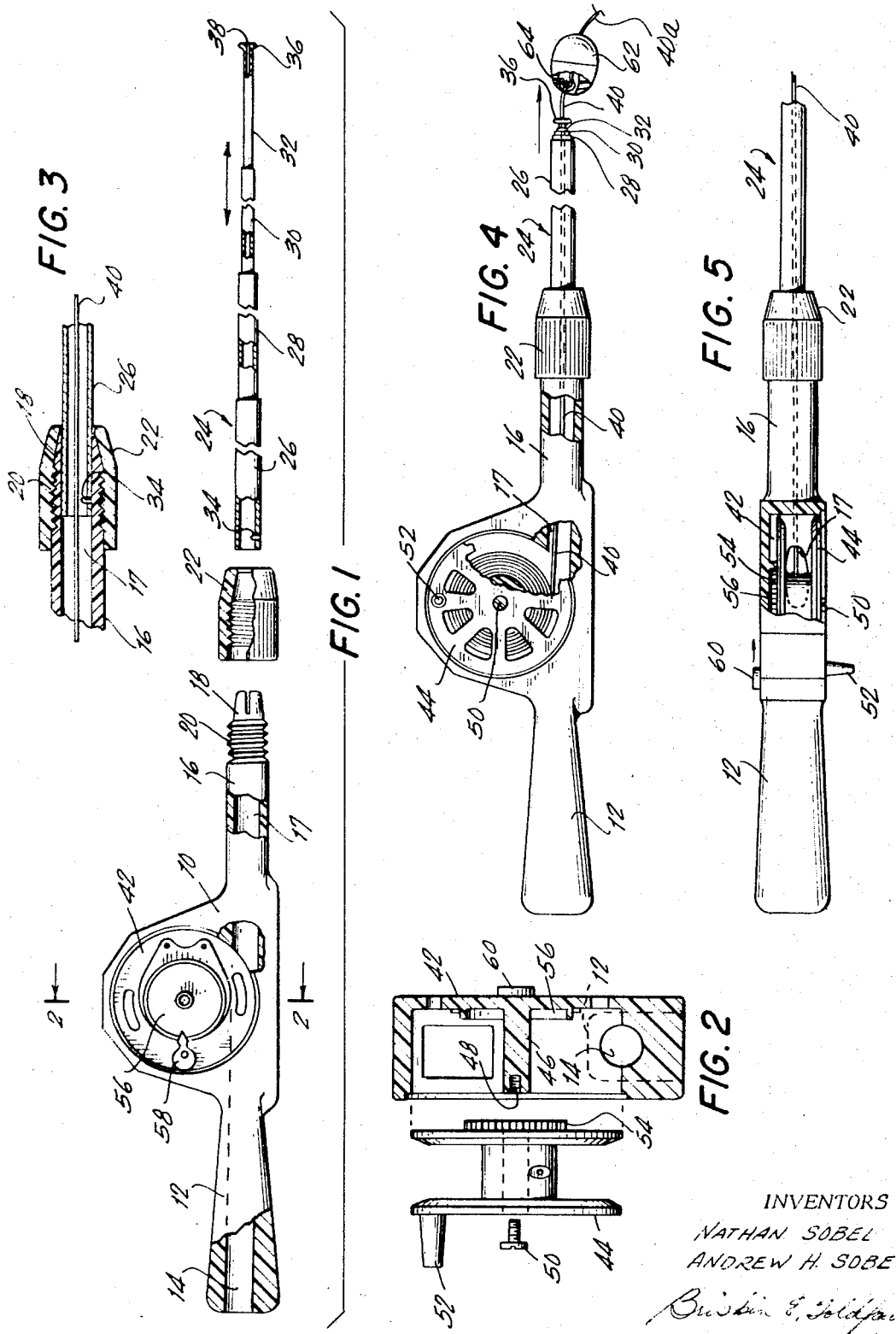

3,447,254
COLLAPSIBLE FISHING ROD
Nathan Sobel and Andrew H. Sobel, both of 2819 W.
12th St., Brooklyn, N.Y. 11224
Filed Sept. 2, 1966, Ser. No. 577,013
Int. Cl. A01k *87/00, 89/00, 87/06*
U.S. Cl. 43—18                                    5 Claims

ABSTRACT OF THE DISCLOSURE

A collapsible fishing rod which can be conveniently collapsed to a size of approximately six inches has clamping means for the fishing rod and a first bore located therein which is coaxial with and also communicates with a second bore located in the handle or grip end of the fishing rod. The handle is provided with an integral receptacle for receiving and rotatably mounting a reel whose pivot means is laterally offset from the common axis of the first bore and the second bore. In its assembled form, the collapsed rod will be no longer than the overall length of the handle body, from the base of the grip to the end of the rod clamping means, since the telescoped rod is straddled by the flanges of the reel.

---

This invention relates to a collapsible fishing rod, and more particularly to a fishing rod which can be extended to the usual length of approximately six or more feet and can be collapsed, merely by the act of reeling in the fishing line, to a size of approximately six inches overall length so that it can be conveniently carried or stored, even in a pocket of the fisherman's clothing.

It is an object of the present invention to provide a fishing rod which can be conveniently collapsed to avoid the danger of injuring bystanders when carrying the rod in public places, and for ease and conveniences in carrying and storing the fishing rod.

Another object of the invention is to provide a collapsible fishing rod which guides the fishing line directly to and from the reel internally of the rod so as to help prevent the fishing line from becoming tangled.

Still another object of the invention is to provide a collapsible fishing rod wherein there is a minimum of friction in the fishing line between the reel and the end of the rod.

A further object of the invention is to provide a convenient storage location within the handle grip for the collapsible tubular portion of the rod, thereby making the collapsed unit even shorter.

To these ends, and in accordance with one feature of the invention, a fishing rod is provided with a handle or body having a receptacle integral therewith for receiving a fishing line reel or spool. The forward end of the handle body is threaded in order to receive a chuck and has pronged ends which clamp the lowermost tube of the extensible tubular fishing line guide tube, either with tubular members extending forwardly or with the tubular members nested into each other and extending backwardly into a bore in the handle grip, in which case the prongs grip near the upper portion of the lowermost section of the tubular members.

These, together with various ancillary objects and other features of the invention which will become more apparent as the following description proceeds, are attained by this article of manufacture, a preferred embodiment of which is illustrated in the accompanying drawing by way of example only, wherein:

FIG. 1 is an exploded side view of the fishing rod according to the invention, with the fishing line spool and fishing line removed, the tubular members being shown in extended position and the view being partially cut away to illustrate the inner construction;

FIG. 2 is a cross section taken along the plane of line 2—2 of FIG. 1, with the fishing line spool portion of the reel added in exploded view;

FIG. 3 is a fragmentary cross sectional view of a portion of the device of FIG. 1;

FIG. 4 is a side view of the device of FIG. 1, illustrating the tubular fishing line guide members in collapsed condition but still assembled in the chuck, and with the fishing line and spool in assembled position;

FIG. 5 is a side view of the device as illustrated in FIG. 4, partially cut away to illustrate the handle structure adjacent the reel;

The same reference numerals are used to designate the same or functionally similar parts throughout the several views. In FIG. 1 there is shown a body portion 10 of the device which comprises a handle or grip 12 provided with an internal bore 14 along at least a major portion of its length. The opposite or forward end of the body 10 comprises a tubular portion 16 having a pronged end 18 and carrying external threads 20 adapted to receive an internally threaded chuck 22. If desired, the tubular body portion 16 may be shortened so that the threads 20 are adjacent the wider portion of the body 10 at the periphery of the spool receptacle, thus making the overall unit shorter. The telescopic fishing line guide tube generally designated by the numeral 24 and having a plurality of telescopically mating tubular sections or members 26, 28, 30, 32 is adapted to fit into a bore 17 within the tubular body portion 16 (FIG. 3) and to be gripped by the prong 18 so that the lowermost tubular member 26 is securely fastened when the chuck 22 is tightened down on the thread 20 by being rotated about the axis of body portion 16. The tubular telescopic members 26, 28, 30, 32 are each provided at their lower end with bottom stops 34, which comprise respective pins extending through a hole in the wall of each tube 26, 28, 30, 32. The uppermost tube 32 carries at its free end an end stop member 36 which comprises a flat circular disc having a central hole 38 through which the fishing line 40 passes.

The rod-supporting body 10 has formed integral therewith a spool receptacle or socket 42, adapted to receive the fishing line spool 44 (FIG. 2). The receptacle 42 is provided with a central post or pivot axis 46 to serve as a shaft about which the reel or spool 44 rotates. The post 46 has internal threads 48 at its outer end for receiving a retaining screw 50 which keeps the spool 44 from slipping outwardly while permitting it to rotate freely about the shaft 46. The spool 44 is provided with a manual rotating handle 52 at its outer surface and with ratchet teeth on a wheel extending from its inner surface, the wheel being arranged to fit into a circular recess 56 in the socket 42 and to be engaged by means of a movable pawl 58 pivotally mounted within the socket 42. A control button 60 serves to swing the pawl 58 into or out of position engaging the ratchet teeth 54. The hollow bore 17 of the tubular body portion 16 extends towards the grip 12 and opens into the socket 42, as best illustrated in FIG. 1, and then continues coaxially from the other side of socket 42 as bore 14 of the grip 12. A float 62 may be attached in a conventional manner to the line 40, such as by means of a spring-biased hook 64 forming part of the float 62.

The apparatus is assembled by inserting the collapsed tubular members 24 into the bore 17 and then tightening the chuck 22 down on the thread 20 so that the prongs 18 grip the outside of the lowermost tube 26.

The spool 44, on which the fishing line 40 has been wound is inserted into the receptacle 42, after threading the line 40 through the bore 17, out past the prongs 18 and through the collapsed telescopic member 24 and then out through the opening 38 of end stop 36. The spool 44 is inserted into the receptacle 42 and fastened into rotatable position on shaft 46 by means of retaining screw 50. The float 62 is then attached to the end of fishing line 40. Of course, the float has connected thereto, at its other end, a fishing line 40a for connection to the fish hook and casting weight (not shown).

In order to collapse the fishing rod into the position of FIG. 4, the spool handle 52 is rotated in order to wind more of the line 40 onto the spool 44. When the surface of the float 62 abuts against the end stop 36 while the line 40 is being reeled in, it presses the end stop 36 towards the body 10, thus forcing tubes 32, 30, 28 and 26 to telescope within each other. The bottom stops 34 prevent the respective tubular members 32, 30, 28 from being pushed out through the bottom of their respective mating members and transmit the telescoping force to the next tubular member until the tubes are all collapsed into the position shown in FIG. 4. Of course, it will be understood that instead of using a float 62, any object larger than the diameter of opening 38 and attached to the fishing line 40 will accomplish the same result, such as the loop end of a fish hook or of a casting weight, or even a large knot tied in the fishing line 40.

For storage purposes, the telescopic line guide 24 may be loosened from prongs 18 by unscrewing the chuck 22, and then moved through the bores 17 and 14 and between the side wheels of spool 44 so that the tube 26 containing internally thereof the tubes 28, 30 and 32 will fit into the bore 14 in the grip 12. Thus, the overall length of the unit will be from the bottom of the grip 12 to the top of the chuck 22. Of course, with the tube 24 in storage position within bore 14, the line-retaining flanges of spool 44 will straddle it, and therefore in order to remove the spool 44 sideways, the telescopic guide 24 will first have to be removed from storage position. The chuck 22 can be tightened down onto thread 20 in order to hold the upper end of tube 26 to retain the collapsed tube 24 in position within the bore 14 of grip 12.

The lateral position of shaft 46, i.e. offset from the common axis of bores 17 and 14 and the diameter of the central portion of the spool 44 are such that the traveling fishing line 40, as it unreels and reels from and onto the spool 44, extends along the axis or bore 17 along the major portion of its travel between the spool 44 and the end stop means 36.

It will be obvious to those skilled in the art, upon studying this disclosure, that devices according to my invention can be modified in various respects and hence may be embodied in apparatus other than as particularly illustrated and described herein, without departing from the essential features of this invention.

We claim:
1. A collapsible fishing rod comprising a hollow rod-supporting body having a first hollow bore defining a bore axis, a plurality of telescopically mating tubular members, means for clamping said tubular members to said body, said body including a handle grip and a receptacle integrally formed therewith, said handle grip having a second hollow bore therein coaxially aligned and communicating with said first bore to define a common bore axis with the latter, a spool in said receptacle and adapted to have line wound thereon, said receptacle having a central shaft means rotatably mounting said spool, said shaft means being laterally spaced from said common bore axis to provide clearance along said common bore axis so as to accommodate said tubular members simultaneously through said first and second bores while said tubular members are straddled by said spool, said first bore and said tubular members being adapted to receive the line from said spool.

2. A collapsible fishing rod according to claim 1, said second hollow bore extending along a major portion of the length of the said handle grip, said spool having line-retaining flanges, said tubular members being mutually telescopically collapsible, said tubular members in collapsed condition thereof being receivable by said clamping means and extending through said first bore and into said second bore between said spool flanges.

3. A collapsible fishing rod according to claim 1, said body having gripping prongs at one end thereof and being provided with external threads, said clamping means including a chuck member having internal threads engageable with said external threads for urging said prongs radially inwardly as said chuck member is rotated about said body.

4. A collapsible fishing rod according to claim 1, said central shaft means including a shaft having one end thereof fixed within said receptacle, a fishing line partially wound on said spool and extending in substantially a straight line along said common bore axis through said first hollow bore and through each of said tubular members.

5. A collapsible fishing rod according to claim 2, said first and said second hollow bores both opening into said receptatcle between said line-retaining flanges.

References Cited

UNITED STATES PATENTS

| 1,785,027 | 12/1930 | Gephart | 43—22 |
| 1,965,796 | 7/1934 | Dunkelberger | 43—22 X |
| 2,334,646 | 11/1943 | Price | 43—24 X |
| 2,957,264 | 10/1960 | Ruff | 43—20 |
| 3,190,578 | 6/1965 | Kondo | 43—20 X |
| 2,191,004 | 2/1940 | Whitcomb | 43—22 |

FOREIGN PATENTS 511,485   4/1955   Canada.

SAMUEL KOREN, Primary Examiner.
JAMES H. CZERWONKY, Assistant Examiner.

U.S. Cl. X.R.
43—20, 22, 23